Figure 3:
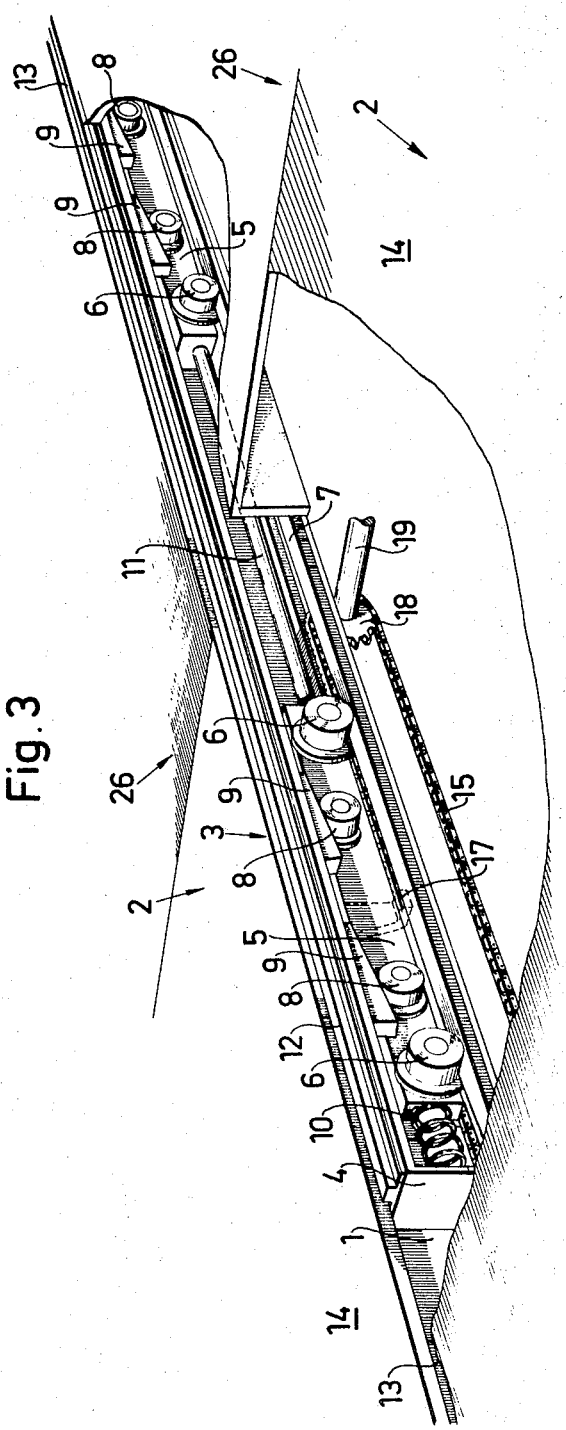

United States Patent

[11] 3,581,880

| [72] | Inventor | Per Iversen |
| | | Sogsti, Norway |
| [21] | Appl. No. | 795,248 |
| [22] | Filed | Jan. 30, 1969 |
| [45] | Patented | June 1, 1971 |
| [73] | Assignee | Aktiebolaget Nordstroms Linbanor |
| | | Kungsbroplan |
| | | Stockholm, Sweden |
| [32] | Priority | Feb. 1, 1968 |
| [33] | | Sweden |
| [31] | | 1374/68 |

[54] CONVEYOR
6 Claims, 5 Drawing Figs.

[52] U.S. Cl. ................................................... 198/219,
214/15
[51] Int. Cl. ........................................................ B65g 25/02

[50] Field of Search. ............................................ 198/219;
214/15, 38.40

[56] References Cited
UNITED STATES PATENTS

| 2,379,231 | 6/1945 | Harrison | 214/15 |
| 2,954,863 | 10/1960 | Staples | 198/219X |
| 3,313,429 | 4/1967 | Cole | 214/38(.40) |

*Primary Examiner* — Robert G. Sheridan
*Attorney* — Birch, Swindler, McKie & Beckett

ABSTRACT: A conveyor of the type which comprises at least one goods-supporting beam movably arranged in a track or guideway which extends in a fixed support surface along the conveying path and which is adapted to be passed with its goods-supporting surface above said stationary support surface in the conveying direction and beneath said stationary support surface in the opposite direction.

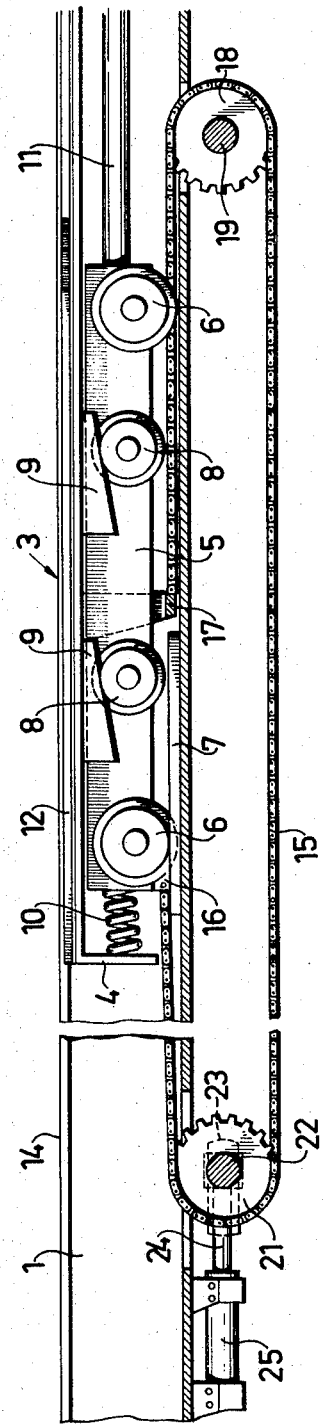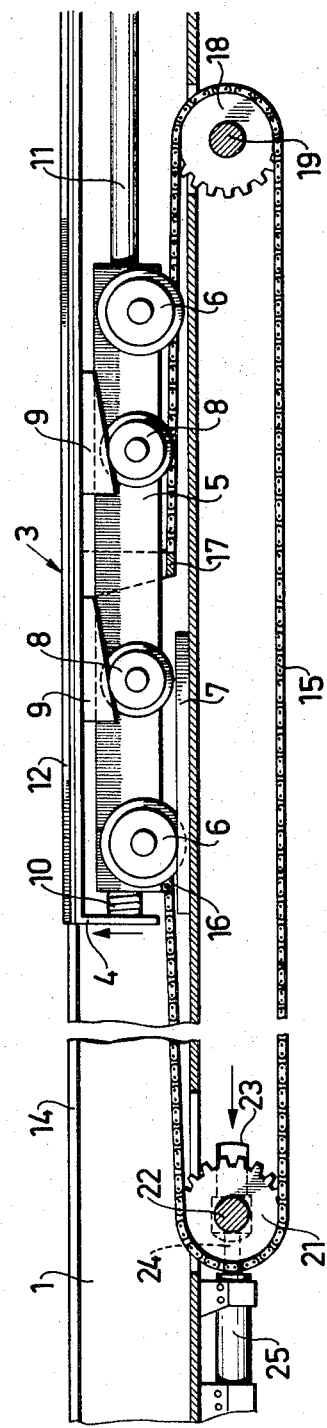

CONVEYOR

Conveyors of this type known to the art are found described in the Swedish Pat. specifications Nos. 205,254, 215,685 and 220,315. In the known embodiments, the support beam extends along the entire length of the conveyor and the movement has a relatively short amplitude. The support beam moves the goods conveyed thereon intermittently, one step with each movement in the conveying direction, and hence these conveyors have been given the designation walking beam conveyors. This means that all items of goods located on the conveyor must be lifted therefrom at each step.

The problem which has occasioned the present invention originates from the conveying technique in which the goods are conveyed in standardized containers of up to 20 tons in weight. The problem resides in the difficulty in handling these heavy and cumbersome load containers in such spaces as the hold of a ship. Conventional wheeled vehicles, such as forklift trucks, are too large and too unwieldy for the loads meant here, and the use of such vehicles is often out of the question. In an attempt to solve the problem, the use of conveyors of the type described has been suggested, but conveyors of this type, walking beam conveyors, hitherto known to the art have not been found suitable since because they lift all the load units at once they must be dimensioned to carry several hundred tons, which in many instances is uneconomical.

The object of the present invention is to solve the aforementioned problems. This object is realized by the invention, which is mainly characterized in that the length of the load support beam is only a fraction of the length of the track and that said beam comprises the body member of a carriage on the chassis of which the load support beam is arranged raisable and lowerable and which is connected to a flexible pull means, to move the carriage an optional distance along the track.

Figure 4:
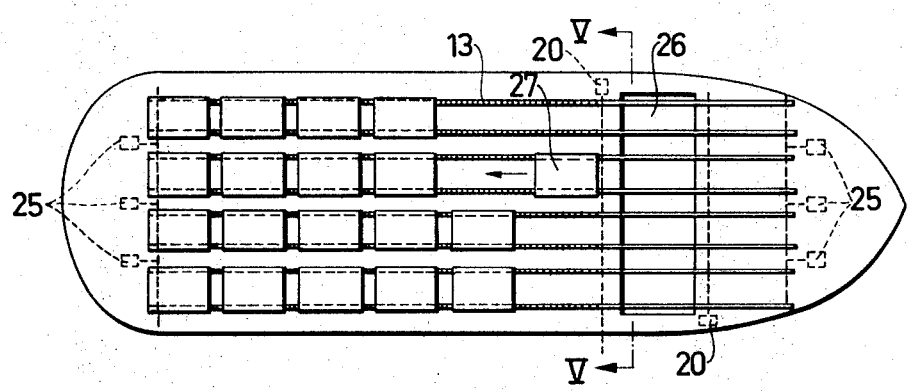
Figure 5:
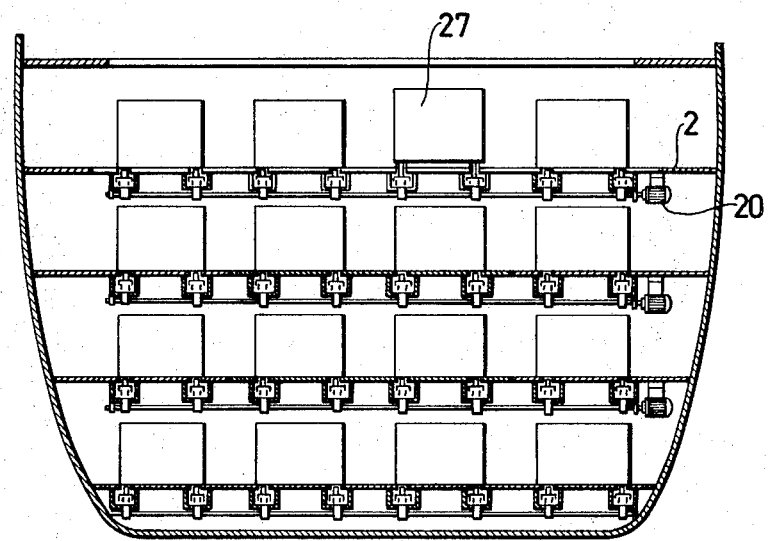

The invention will now be described with reference to the accompanying drawing, in which FIGS. 1 and 2 show in longitudinal sections two different positions of a conveyor according to the invention, FIG. 3 is a cutaway view of the conveyor in perspective, FIG. 4 shows in plan view how a vessel, fitted with the conveyors of the invention, is loaded with containers, and FIG. 5 is a vertical section through the line V-V in FIG. 4.

In the exemplary embodiment shown in the drawings, the conveyor consists of two parallel tracks 1 in the deck 2 of a ship and a carriage 3 arranged in each track. The carriage comprises a body member 4 in the form of a support beam and a chassis 5. The chassis 5 is provided with wheels 6 which roll on rails 7 on the bottom of tracks 1, and with wheels 8 which roll against wedge-shaped cams 9 disposed in the body member 4. A compression spring 10 is attached between the body member and the chassis. In the illustrated embodiment the chassis comprises two end portions securely connected together by means of a rod 11, each end portion of said chassis being provided with two pairs of wheels 6 and two pairs of wheels 8. The support beam 4 presents at the top thereof a longitudinally extending strip 12, the upper side of which forms the load support surface of the beam, projecting through a slot 13 in the deck, the slot thus comprising the only entrance for the track 1 through the upper surface 14 of the deck 12; the track is closed in all other respects.

Movement of the carriage 3 is effected by a chain 15 connected to said carriage, one end 16 of the chain being connected to the chassis 5 and the other end to the load-carrying beam 4. The chain passes over a sprocket wheel 18, whose shaft 19 is driven by a motor 20, and a tensioning sprocket wheel 21, whose shaft is arranged movable in a guide structure 23 and connected with the piston rod 24 of a ram 25. The conveyor, in contradistinction to the walking beam conveyor suitably designated a running beam conveyor, operates in the following manner. In FIG. 1 the conveyor is shown in its nontransporting position, with the load support beam 4 lowered against the chassis. The carriage can now be moved empty, together with the carriage running in the parallel track, to the desired position beneath the object to be transported and resting on the stationary support surface 14. When the carriage has reached the aforementioned position, the chain is tensioned against the action of the compression spring 10, by withdrawing the piston in the ram, whereupon the shaft 22 moves to the left, as seen in the FIGS. The chassis is thus moved in relation to the body member and wheels 8 roll against the cams 9, whereupon the body member, the load-carrying beam, is raised and the strip 12 protrudes out with its upper support surface above the stationary support surface 14, the load unit in question being lifted therefrom. The drive motor is then started and the carriage moved to the desired position and lowered down on to the stationary support surface. The weight of the load-carrying beam is normally sufficient to ensure that the beam lowers into position when tension on the chain is relieved; the compression spring 10, however, has been provided to amplify this sinking action of the beam.

To allow the conveyor to receive goods through the hatch opening in an overlying deck without being hindered by the hatch opening in its own deck, the track may continue into hatch cover 26 (FIG. 3) and, because the chain is attached to the carriage in the vicinity of the end remote from the hatch opening, the carriage can move over the sprocket wheel 18 and into cover 26 as far as is necessary to receive goods through the hatch of an overlying deck.

The conveyor of the exemplary embodiment is particularly intended for use in conveying containers whose corners are provided with standardized boxlike fittings. The two conveyor tracks are so spaced apart that when conveying the goods the said corner fittings rest on strips 12. FIG. 4 illustrates the arrangement of four conveyors on a deck of a ship. The sprocket wheels are arranged on common shafts with three rams 25 and one drive motor 20. A load container 27 is shown on the way from hatch cover 26. FIG. 5 shows in vertical section how the load container 27 is still lifted on the carriages of the conveyor and how the other decks are filled with containers. As shown in FIG. 4, a further array of conveyors is arranged on the other side of the loading hatch, these conveyors using, in the same way, the tracks disposed in the hatch cover. The conveyors and containers have been shown spaced relatively widely apart. In practice the conveyors are, of course, placed closer together, which is made possible when handling containers with conveyors constructed according to the invention.

It should be understood that the conveyor is not restricted to the illustrative embodiment. For instance, the loop formed by the chain can be placed horizontally, thus saving space but necessitating one motor for each chain wheel. Furthermore, the means used to raise and lower the body member 4 may comprise link systems instead of wheels and cams. The conveyors may also be made to extend into shell doors of such vessels which are loaded through the hull.

I claim:

1. A conveyor for installation in a track opening in a stationary surface comprising
   rail means installed beneath said track opening,
   a chassis engaging said rail means and movable thereon,
   a body member carried by said chassis, said body member having a load support beam and being movable with respect to said chassis between a lowered position and a raised position above said lowered position wherein said load support beam extends upwardly through said track opening above said stationary support surface,
   a drive sprocket wheel and a tension sprocket wheel spaced apart along said rail means,
   a chain for moving said chassis on said track looped about said drive sprocket wheel said tension sprocket wheel, said chain having one end attached to said chassis and the other end attached to said body member, whereby said chain can pull said chassis and said body member in either direction along said rail,
   means for driving said drive sprocket wheel, elevating means responsive to the tension applied to said chain interposed between said chassis and said body member, said elevating means moving said body member from one of said positions to the other of said positions when said chain is tensioned to a predetermined degree and from said other of said positions to said one of said positions when the tension is relaxed, and ram means operatively connected to said tension sprocket wheel for varying the distance between said drive sprocket wheel and said tension sprocket wheel to alter the tension on said chain.

2. A conveyor according to claim 1, wherein said elevating means moves said body member from said lowered position to said raised position when said chain is tensioned and from said raised position to said lowered position when the tension is relaxed.

3. A conveyor according to claim 1, further comprising spring means biasing said body member toward said lowered position.

4. A conveyor according to claim 1, wherein said elevating means comprises a plurality of wheels mounted on said chassis and a plurality of wedge-shaped cams mounted on said body member and engaging said wheels, whereby in response to the tension applied to said chain said cams roll upon said wheels to vary the position of said body member with respect to said chassis.

5. A conveyor according to claim 1 wherein the loop formed by said chain extends horizontally.

6. A plurality of conveyors each according to claim 1 wherein said drive sprocket wheel of each of said conveyors is mounted on a common drive shaft with said drive sprocket wheel of each of the other of said plurality of conveyors and said tension sprocket wheel of each of said conveyors is mounted on a common tension shaft with said tension sprocket wheel of each of the others of said plurality of conveyors, said common drive shaft being driven by a common drive means and said common tension shaft being operated by a common ram, whereby driving force and tensioning force can be coincidentally imparted to said plurality of conveyors.